Nov. 17, 1936. K. BERGER Re. 20,170
SWIVEL HARP FIXTURE FOR ELECTRIC LAMPS
Original Filed March 9, 1934
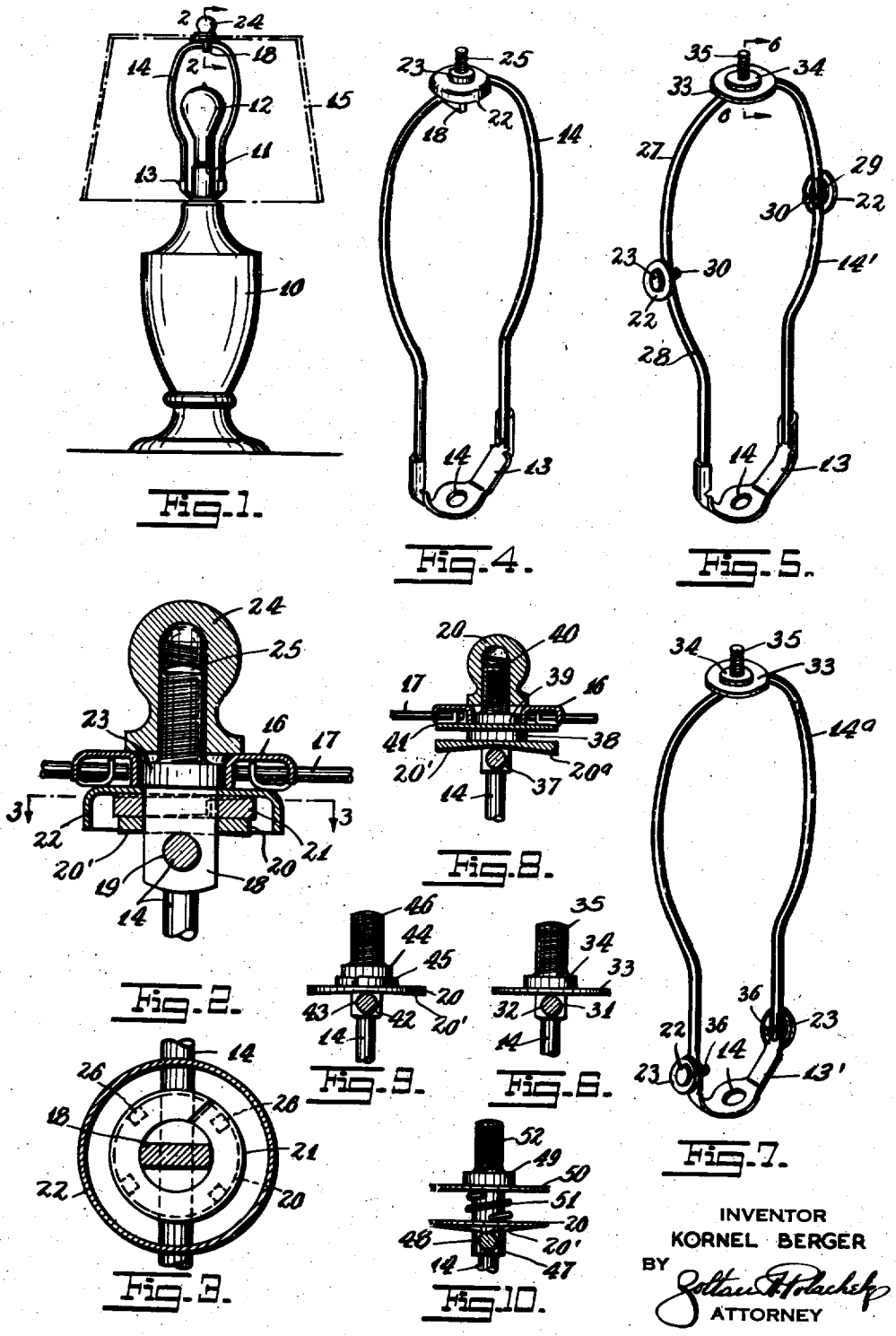
INVENTOR
KORNEL BERGER
BY Zoltan Polachek
ATTORNEY Reissued Nov. 17, 1936

Re. 20,170

UNITED STATES PATENT OFFICE 20,170

SWIVEL HARP FIXTURE FOR ELECTRIC LAMPS

Kornel Berger, New York, N. Y.

Original No. 1,974,947, dated September 25, 1934, Serial No. 714,810, March 9, 1934. Application for reissue May 11, 1935, Serial No. 21,068

13 Claims. (Cl. 240—148)

This invention relates to new and useful improvements in a swivel harp fixture for electric lamps.

The invention has for an object the construction of a fixture as mentioned characterized by a wire harp frame, a stud swivelly supported on the wire frame, and an arrangement for frictionally holding the stud against swiveling.

Still further the invention particularly proposes an arrangement of a resilient means on the stud acting between a washer slidable upon the stud and resting against the frame for constituting the means to frictionally control the swiveling of the stud.

As another object of this invention it is proposed to provide a casing in conjunction with the stud for extending over and partially covering the resilient element.

Another one of the objects of this invention is the provision of a protuberance on the stud forming a shoulder for the casing mentioned in the previous paragraph and an arrangement whereby a knob threadedly engages a shank on the top of the stud for acting against a shade frame in a manner so that the shade frame engages against the casing and so aids in controlling the action of the resilient element.

Still further the invention proposes the provision of cam portions arranged upon a washer slidable and rotatable upon the stud for controlling the pressure and thus the friction between the washer and the wire harp frame.

Still further the invention proposes the construction of articles as mentioned which are simple and durable and which may be manufactured and sold at a reasonable cost.

For further comprehension of the invention, and of the objects and advantages thereof, reference will be had to the following description and accompanying drawing, and to the appended claims in which the various novel features are more particularly set forth.

In the accompanying drawing forming a material part of this disclosure:—

Fig. 1 is a side elevational view of an electric lamp with a swivel harp structure according to this invention.

Fig. 2 is a fragmentary enlarged sectional view taken on the line 2—2 of Fig. 1.

Fig. 3 is a horizontal sectional view taken on the line 3—3 of Fig. 2.

Fig. 4 is a perspective view of the swivel harp fixture per se.

Fig. 5 is a perspective view similar to Fig. 4 but illustrating another embodiment of the invention.

Fig. 6 is a fragmentary sectional view taken on the line 6—6 of Fig. 5.

Fig. 7 is a perspective view similar to Fig. 4, but illustrating a still further modified form of harp fixture.

Fig. 8 is a sectional view similar to Fig. 2 but illustrating a modification of the invention.

Fig. 9 is another sectional view similar to Fig. 2 but illustrating a still further modified form.

Fig. 10 is another view similar to Fig. 2 but illustrating a still further modified form.

The swivel harp fixture according to this invention in Fig. 1, is shown mounted upon a lamp 10 having a conventional lamp socket 11 supporting the electric light 12.

The fixture comprises a bracket element 13 formed with an opening 14 adapted to engage over a stud upon which the socket 11 is mounted to the lamp. The details of this construction is not given in this specification since it forms no part of the invention and is generally known in the art. The harp fixture includes a wire member 14 bent substantially into U-shape, but inverted and having its ends secured to the bracket 13.

The dot and dash lines 15 illustrate a lamp shade. Details of this lamp shade are not important except that it is provided with a central annular portion 16 from which radial wire ribs 17 project. The other details of the construction of the lamp shade 15 are not important and consequently are not shown upon the drawing since they form no part of the invention.

A stud 18 is formed with a transverse opening 19 through which a portion of the wire harp frame 14 extends. A method of constructing the wire harp frame is to engage the wire from which the harp frame is formed, while still in a straight condition, through the opening 14 and then bending the ends and the sides into a proper shape. A washer 20 is slidably mounted upon the stud 18 and is for the purpose of resting against the upper portion of the wire frame 14. A resilient element 21 is also mounted upon the stud 18 and acts between the stud and the washer 20 for frictionally controlling the swiveling of the stud 18 upon the wire frame 14.

The resilient element 21 does not directly engage against an abutting porion of the stud but acts against a casing 22 which is also arranged slidably upon the stud 18 but in turn engages against a protuberance or enlarged portion 23 upon the stud. The resilient element 21 is in the form of a conventional flat split lock washer. The annular member 16 is adapted to engage over the enlarged member 23 and to directly engage against the top of the casing 22. The casing 22 is formed from a flat disc which has its ends turned downwards so as to cover the resilient member 21 and the washer 20. A knob 24 threadedly engages upon a threaded portion 25 projecting from the top of the protuberance 23.

One of the features of this invention is the fact that the knob 24 may be turned over down upon the threaded portion 25 for the purpose of urging or pressing the annular member 16 against the casing 22 for compressing and adding more tension to the resilient element 21 which in turn will transfer the stress to the washer 20 acting against the frame 14 and so aid in controlling the frictional resistance of swiveling of the stud 18.

A resilient means is also provided for adjusting or varying the pressure of the resilient element 21. This latter means comprises cam portions 20′ formed upon the bottom face of the washer 20 and comprising a portion on each side of the bottom face of the washer 20 relative to the wire frame 14. These portions are included in a manner so that as the washer 20 is turned to the various rotative positions out portions of the bottom face thereon will act against the wire frame 14 and so compress or release the resilient member 21. The periphery of the washer 20 is formed with several cutout portions 26 adapted to be engaged by a suitable turning tool so that the washer may readily be turned to any adjustable position. These cutouts 26 are arranged in diametrically opposite pairs and it is advisable that the turning tool engage one of the pairs to grip the washer for the turning. In Fig. 4 a perspective view of the swivel harp fixture has been disclosed in which the lamp shade 15 and the knob 24 is removed. This view is shown so that the shapes of certain of the parts may be readily understood.

In Figs. 5 and 6 another form of the invention has been disclosed wherein a swivel harp frame 14′ consisting of an upper section 27 and a lower section 28 pivotally connected with a joint 29 or with the sections 27 and 28 may be set at various inclinations to each other. The joint 29 includes a screw 30 adapted to clamp the sections in adjusted positions.

A stud 31 is formed with an opening 32 through which the upper portion of the frame section 27 passes. A washer 33 is arranged upon a stud 31 and frictionally engages against the upper portion of the frame section 27 for frictionally holding the stud from swiveling. The stud 31 is formed with an enlarged portion 34 immediately above the washer 33 so as to hold the washer in position. The upper portion 35 of the stud is threaded for receiving a knob such as 24, previously described. In other respects this form of the invention is similar to the preferred form and similar parts may be recognized by corresponding reference numerals.

In Fig. 7 another embodiment of the invention has been disclosed which is similar to the form illustrated in Figs. 5 and 6 but distinguish merely in the construction of the wire harp frame 14ᵃ. This frame is similar to the frame 14 except for the lower ends thereof which are pivotally connected with the bracket 13 by the pintle bolts 36. These pintle bolts are adapted to clamp the frame 14ᵃ at various positions upon the bracket 13′. In other respects, the construction is identical to that previously described, and the similar parts may be recognized by the corresponding reference numerals.

In Fig. 8 another embodiment of the invention has been disclosed wherein a stud 37 is shown swivelly mounted upon the wire frame 14 and is shown formed with an enlarged portion 38, a second enlarged portion 39, and a top threaded portion 40. A washer 20ᵃ engages upon the stud 37′ against the shoulder formed by the bottom side of the portion 38. This washer 20ᵃ has its lower face formed with the ca n surface 20. The arrangement is such that the washer may be turned to various rotative positions for the purpose of controlling the tension between the washer and the frame 14 as previously described.

A second washer 41 engages upon the enlarged portion 39 which is of a slightly smaller diameter than the portion 38 so that a shoulder is formed constituting the top surface of the portion 38 upon which the washer 41 rests. The annular member 16 engages over the portion 39 and rests against the washer 41. This annular member 16 is formed with a radial arm 17. The details of the lamp shade are not given. A knob 20 is shown threadedly engaging the portion 40 and urging the annular member 16 against the washer 41.

In Fig. 9 another modified form of the invention has been disclosed wherein a stud 42 is shown formed with an opening 43 by which it is mounted upon the frame 14. This stud is formed with an enlarged portion 44 and a resilient element in the form of a lock washer 45 acts against the shoulder formed by the bottom face of the enlarged portion 44 and a washer 20 mounted slidably upon the stud 42 immediately against the upper side of the frame 14. This washer 20 is formed with the cam faces 20′ as previously described. The arrangement is such that the washer 20 may be turned for controlling the pressure against the frame 14 and so control the swiveling of the stud 42. The upper end of the stud 42 is formed with a threaded portion 46 for a knob as previously described.

In Fig. 10 another modified form of the invention has been disclosed wherein a stud 47 is shown with an opening 48 through which a portion of the frame 14 passes so that the stud is swivelly mounted upon the frame. A washer 20 is rotative upon the stud 47 and has the cam surfaces 20′ on its bottom face as previously described. The stud is provided with an enlarged portion 49. A washer is slidable upon the stud 47 and engages against the shoulder formed by the bottom face of the enlarged portion 49. An expansion spring 51 is disposed between the washers 50 and 20 and serves to urge the washer 20 against the frame 14.

The upper portion of the stud is formed with a threaded portion 52 in the knob as previously described. The spring 51 constitutes the resilient element for urging the washer 20 against the frame 14.

A feature of the invention is that the stud may be placed to various positions upon the frame, that is inclined positions for the purpose of holding the lamp shade 15 at various inclined positions. The resilient elements which function to frictionally hold the stud in adjusted positions serves to maintain and hold the stud even though the lamp may be used for a considerable length of time and the opening in the stud through which the wire of the lamp frame passes becomes worn. If not for the resilient arrangement the stud would soon be too loose upon the frame and freely move downwards into an undesirable position. The arrangement of the resilient element prevents this disadvantage.

While I have illustrated and described the preferred embodiment of my invention it is to be understood that I do not limit myself to the precise construction herein disclosed and the right is reserved to all modifications and changes coming within the scope of the invention as defined in the appended claims.

Having thus described my invention, what I claim as new and desire to secure by United States Letters Patent is:

1. A swivel harp fixture for an electric lamp, comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame.

2. A swivel harp fixture for an electric lamp, comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame, said wire harp frame comprising a piece of wire engaging through said stud and bent at the ends and connected with a supporting bracket.

3. A swivel harp fixture for an electric lamp, comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame, said washer being formed with a cam portion upon its bottom face and being rotative upon said stud for controlling the pressure and thus the friction between the washer and the frame.

4. A swivel harp fixture for an electric lamp, comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame, said washer being formed with a cam portion upon its bottom face and being rotative upon said stud for controlling the pressure and thus the friction between the washer and the frame, said washer being formed with several peripheral cutout portions to facilitate gripping of the washer for its rotation.

5. A swivel harp fixture for an electric lamp, comprising a wire harp frame having a portion passing through a stud for swivelly supporting the stud, a washer slidable on said stud and resting against a portion of said frame, a resilient element on said stud acting between said stud and washer for frictionally controlling the swiveling of the stud on said frame, and a casing on said stud for extending over said resilient element.

6. A swivel harp fixture for an electric lamp, comprising a wire harp frame having a portion passing through a stud for swivelly supporting the stud, a washer slidable on said stud and resting against a portion of said frame, a resilient element on said stud acting between said stud and washer for frictionally controlling the swiveling of the stud on said frame, and a casing on said stud for extending over said resilient element, said casing being located between said resilient element and a protuberance upon said stud.

7. A swivel harp fixture for an electric lamp, comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame, the upper end of said stud being formed with a threaded portion, and a knob engaging said threaded portion for clamping against an annular member of a lamp shade for urging the annular member against the casing and so functioning against resilient elements for controlling the pressure thereof.

8. A swivel harp fixture for electric lamps, comprising a wire harp frame having a portion passing through a stud for swivelly supporting the stud, a washer on said stud and resting against a portion of said frame and against a protuberance on said stud, a second washer resting upon the other side of said protuberance, a smaller sized portion on the top of said protuberance and a threaded portion from said latter mentioned portion.

9. A swivel harp fixture, for an electric lamp comprising a wire harp frame having a portion passing through a stud for swivelly supporting the stud, a washer slidable on said stud and resting against a portion of said frame, and a resilient element on said stud acting between said stud and washer for frictionally controlling the swiveling of the stud on said frame, said stud being formed with an enlarged portion, and said resilient element acting against said enlarged portion and said washer.

10. A swivel harp fixture for an electric lamp, comprising a harp frame having a portion passing through a stud for swivelly supporting the stud, a washer slidable on said stud and resting against a portion of said frame, and a resilient element on said stud acting between said stud and washer for frictionally controlling the swiveling of the stud on said frame.

11. A swivel harp fixture for mounting a shade on an electric lamp, comprising a wire harp frame, a stud adjustably mounted on a portion of said frame for supporting said shade, a washer mounted on said stud, and shoulder means forming a permanent part of said stud for holding said washer in frictional engagement with said frame and for supporting said lamp shade.

12. A swivel harp fixture for mounting a shade on an electric lamp, comprising a wire harp frame, a stud adjustably mounted on a portion of said frame for supporting said shade, a washer mounted on said stud, means for removably attaching said shade on said stud, and shoulder means independent of said shade attaching means and forming a permanent portion of said stud for holding said washer in frictional engagement with said frame.

13. A swivel harp fixture for mounting a shade on an electric lamp, comprising a wire harp frame, a stud adjustably mounted on a portion of said frame for supporting said shade, a washer mounted on said stud, threaded means for removably attaching said shade on said stud, shoulder means between said washer and said threaded means and forming a permanent portion of said stud for holding said washer in frictional engagement with said frame in relationship independent of said threaded means.

KORNEL BERGER.